(12) United States Patent
Tabaddor et al.

(10) Patent No.: US 12,260,299 B2
(45) Date of Patent: Mar. 25, 2025

(54) USING MACHINE LEARNING TO VIRTUALIZE PRODUCT TESTS

(71) Applicant: UL LLC, Northbrook, IL (US)

(72) Inventors: Mahmood Tabaddor, Rochester, MI (US); Anthony Tassone, Melville, NY (US); Mario Xerri, Melville, NY (US); Priyansu Panda, Karnataka (IN); Pravinray D. Gandhi, Elk Grove Village, IL (US)

(73) Assignee: UL LLC, Northbrook, IL (US)

( * ) Notice: Subject to any disclaimer, the term of this patent is extended or adjusted under 35 U.S.C. 154(b) by 296 days.

(21) Appl. No.: 16/894,490

(22) Filed: Jun. 5, 2020

(65) Prior Publication Data
US 2021/0334699 A1    Oct. 28, 2021

(30) Foreign Application Priority Data
Apr. 24, 2020    (IN) .............................. 202021017725

(51) Int. Cl.
G06Q 30/018    (2023.01)
G06N 20/00    (2019.01)

(52) U.S. Cl.
CPC .......... *G06N 20/00* (2019.01); *G06Q 30/018* (2013.01)

(58) Field of Classification Search
CPC ............................. G06N 20/00; G06Q 30/018
See application file for complete search history.

(56) References Cited

U.S. PATENT DOCUMENTS

| 6,043,312 A | * | 3/2000 | Fagher | H01B 7/295 |
| | | | | 174/110 V |
| 10,338,565 B1 | * | 7/2019 | Coffman | G06N 20/00 |
| 2008/0231307 A1 | * | 9/2008 | Bickford | G01R 31/2894 |
| | | | | 707/999.1 |

(Continued)

FOREIGN PATENT DOCUMENTS

| CN | 204255891 U | 4/2015 |
| CN | 105301173 A | 2/2016 |

(Continued)

OTHER PUBLICATIONS

Khan, M.M., Bill, R.G., Jr. and Alpert, R.L. (2006), Screening of plenum cables using a small-scale fire test protocol. Fire Mater., 30: 65-76. https://doi.org/10.1002/fam.899 (Year: 2006).*

(Continued)

*Primary Examiner* — Dipen M Patel
(74) *Attorney, Agent, or Firm* — MARSHALL, GERSTEIN & BORUN LLP

(57) ABSTRACT

Systems and methods for using machine learning models to predict an outcome of a product test are described. According to certain aspects, an electronic device may generate a machine learning model using training data indicating a set of results of a set of products tested according to a specific product test. The electronic device may access a set of inputs comprising a set of additional results of at least one additional product tested according to a modified product test, and input the set of inputs into the machine learning model. Based on an output of the machine learning model, the electronic device may predict whether the at least one additional product would pass or comply with the original specific product test.

4 Claims, 5 Drawing Sheets

(56) References Cited

U.S. PATENT DOCUMENTS

| | | | | |
|---|---|---|---|---|
| 2009/0022462 | A1* | 1/2009 | Papazoglou | C08K 3/34 |
| | | | | 524/319 |
| 2015/0294246 | A1* | 10/2015 | Guven Kaya | G06Q 10/06393 |
| | | | | 705/7.28 |
| 2017/0286839 | A1* | 10/2017 | Parker | G06N 20/20 |
| 2017/0308802 | A1* | 10/2017 | Ramsøy | G06N 20/00 |
| 2018/0001184 | A1* | 1/2018 | Tran | G16H 50/20 |
| 2019/0147371 | A1* | 5/2019 | Deo | G06N 20/20 |
| | | | | 706/12 |
| 2019/0370684 | A1* | 12/2019 | Gunes | G06N 20/00 |
| 2020/0115066 | A1* | 4/2020 | De Munck | G06N 20/00 |
| 2020/0117580 | A1* | 4/2020 | Lekivetz | G06F 11/368 |
| 2020/0348646 | A1* | 11/2020 | Coffman | B33Y 50/00 |
| 2020/0387148 | A1* | 12/2020 | Ghosh | G06K 9/6267 |
| 2021/0209488 | A1* | 7/2021 | Li | G06N 3/063 |
| 2022/0414539 | A1* | 12/2022 | Oren | G06F 11/3447 |

FOREIGN PATENT DOCUMENTS

| | | | | |
|---|---|---|---|---|
| CN | 107817170 | A | | 3/2018 |
| CN | 207067095 | U | | 3/2018 |
| CN | 207528672 | U | | 6/2018 |
| CN | 106057053 | B | | 1/2019 |
| CN | 208526167 | U | | 2/2019 |
| CN | 110009052 | A | | 7/2019 |
| CN | 110009241 | A | * 7/2019 | G06F 17/11 |
| CN | 110322769 | A | | 10/2019 |
| CN | 112214933 | A | * 1/2021 | G06F 17/11 |
| KR | 10-2006-0095671 | A | | 9/2006 |
| KR | 2006095671 | A | * 9/2006 | G06F 17/11 |
| KR | 20190047809 | A | * 5/2019 | G06F 17/11 |
| KR | 20190060547 | A | * 6/2019 | G06F 17/11 |

OTHER PUBLICATIONS

Nam S, Bill RG. A New Intermediate-scale Fire Test for Evaluating Building Material Flammability. Journal of Fire Protection Engineering. 2009;19(3):157-176. doi:10.1177/1042391508101994 (Year: 2009).*

Magalie, Carcillo & A.S, Caro-Bretelle & Sonnier, Rodolphe & Ferry, Laurent & Emmanuelle, Gesta & Christian, Lagrève. (2018). Fire behaviour of electrical cables in cone calorimeter: Influence of cables structure and layout. Fire Safety Journal. 99. 12-21. 10.1016/j.firesaf.2018.05.001. (Year: 2018).*

Cone Calorimeter, The National Institute of Standards and Technology (NIST), Jun. 5, 2014, https://www.nist.gov/laboratories/tools-instruments/cone-calorimeter (Year: 2014).*

"IEEE Standard for the Testing, Design, Installation and Maintenance of Electrical Resistance Heat Tracing for Industrial Applications," in IEEE Std 515-1997 , vol. No., pp. 1-80, Jun. 2, 1997, doi: 10.1109/IEEESTD.1997.82402. (Year: 1997).*

"IEEE Guide for Fire Hazard Assessment of Electrical Insulating Materials in Electrical Power Systems," in IEEE Std 1221-1993 , vol. No., pp. i-, 1994, doi: 10.1109/IEEESTD.1994.119221. (Year: 1994).*

Gallo et al., Assessing the reaction to fire of cables by a new bench-scale method, Fire and Materials, vol. 41, Issue 6, Summary only (Dec. 12, 2016).

Khan et al., Screening of plenum cables using a small-scale fire test protocol, Fire and Materials, 36:65-76 (2006).

Nam et al., A new intermediate-scale fire test for evaluating building material flammability, Journal of Fire Protection Engineering, vol. 19, pp. 157-176 (Aug. 2009).

Magalie et al., Fire behaviour of electrical cables in cone calorimeter: Influence of cables structure and layout, Fire Safety Journal 99:12-21 (2018).

International Application No. PCT/US2021/026830, International Search Report and Written Opinion, mailed Jul. 23, 2021.

* cited by examiner

USING MACHINE LEARNING TO VIRTUALIZE PRODUCT TESTS

CROSS-REFERENCE TO RELATED APPLICATION

This application claims priority to Indian Patent Application No. 202021017725, filed Apr. 24, 2020, which is hereby incorporated by reference in its entirety.

FIELD

The present disclosure is directed to using machine learning to virtualize product tests. More particularly, the present disclosure is directed to platforms and technologies for predicting an outcome of a product test using a machine learning model trained on real-world testing data.

BACKGROUND

Various products are used in various applications, projects, building constructions, and the like. For example, cables are frequently installed and utilized in buildings for various purposes. In a specific instance, communication cables are used to transmit information between systems such as servers, personal computers, and other hardware. Certain types of products are subject to different requirements and standards, depending on the applicable jurisdiction. For example, the National Fire Protection Association (NFPA) has standard NFPA 262, the Standard Method of Test for Flame Travel and Smoke of Wires and Cables for use in Air-Handling Spaces. This standard improves fire safety in air-handling spaces by presenting a test procedure to evaluate the potential for smoke and fire spread along cables and wires housed in a plenum or other air transport spaces. The NFPA 262 test method evaluates cables for adequate fire-resistant and low smoke-producing characteristics, and in particular determines whether a cable exhibits a maximum peak optical density (0.5 or less), an average optical density (AOD) (0.15 or less), and a maximum flame spread distance (1.52 m (5 ft) or less).

Certain product tests require that the physical specimens to be tested meet certain criteria. For example, NFPA 262 requires a number of cable lengths twenty four (24) feet long in the horizontal orientation. The number of cable lengths to be laid in the test chamber is determined by the cable diameter. When a cable manufacturer intends to have a plenum cable certified for the US market, the cable manufacturer must produce or manufacture a sufficient length of representative cable to be tested in accordance with NFPA 262. In some situations, the cable manufacturer may contemplate bringing more than one type of plenum cable to market (or may otherwise not know which of multiple cables may pass certain standards), in which case the cable manufacturer must produce or manufacture multiple cable specimens. However, producing or manufacturing cables of such length, or generally complying with requirements of large-scale product tests such as NFPA 262, can be considered costly and cumbersome. Additionally, the specimen requirement may be a disincentive for manufacturers to innovate new products.

Accordingly, there is an opportunity to combine machine learning and data models from small-scale tests to predict the outcome of certain standards tests, thus alleviating these existing drawbacks of large-scale product tests.

SUMMARY

In an embodiment, a computer-implemented method for predicting an outcome of a large-scale product test is provided. The method may include: generating, by a processor, a machine learning model using an initial dataset indicating an initial set of results of (i) a set of large-scale products tested according to the large-scale product test, and (ii) a set of small-scale products tested according to a small-scale product test; accessing, by the processor, an additional set of small-scale results of a product tested according to the small-scale product test; inputting, by the processor, the additional set of results into the machine learning model; and after inputting the additional set of results into the machine learning model, outputting, by the processor, a result from the machine learning model, the result predicting an outcome of the product tested according to the large-scale product test.

In another embodiment, a system for predicting an outcome of a large-scale product test is provided. The system may include: a processor, a memory storing data associated with a machine learning model, and a non-transitory computer-readable memory interfaced with the processor, and storing instructions thereon that, when executed by the processor, cause the processor to: generate the machine learning model using an initial dataset indicating an initial set of results of (i) a set of large-scale products tested according to the large-scale product test, and (ii) a set of small-scale products tested according to a small-scale product test, access an additional set of small-scale results of a product tested according to the small-scale product test, input the additional set of results into the machine learning model, and after inputting the additional set of results into the machine learning model, output a result from the machine learning model, the result predicting an outcome of the product tested according to the large-scale product test.

In a further embodiment, a non-transitory computer-readable storage medium is provided. The non-transitory computer-readable storage medium may store a set of instructions, executable by a processor, for predicting an outcome of a large-scale product test, where the instructions may comprise: instructions for generating a machine learning model using an initial dataset indicating an initial set of results of (i) a set of large-scale products tested according to the large-scale product test, and (ii) a set of small-scale products tested according to a small-scale product test; instructions for accessing an additional set of small-scale results of a product tested according to the small-scale product test; instructions for inputting the additional set of results into the machine learning model; and instructions for, after inputting the additional set of results into the machine learning model, outputting a result from the machine learning model, the result predicting an outcome of the product tested according to the large-scale product test.

DETAILED DESCRIPTION

Figure 1A:
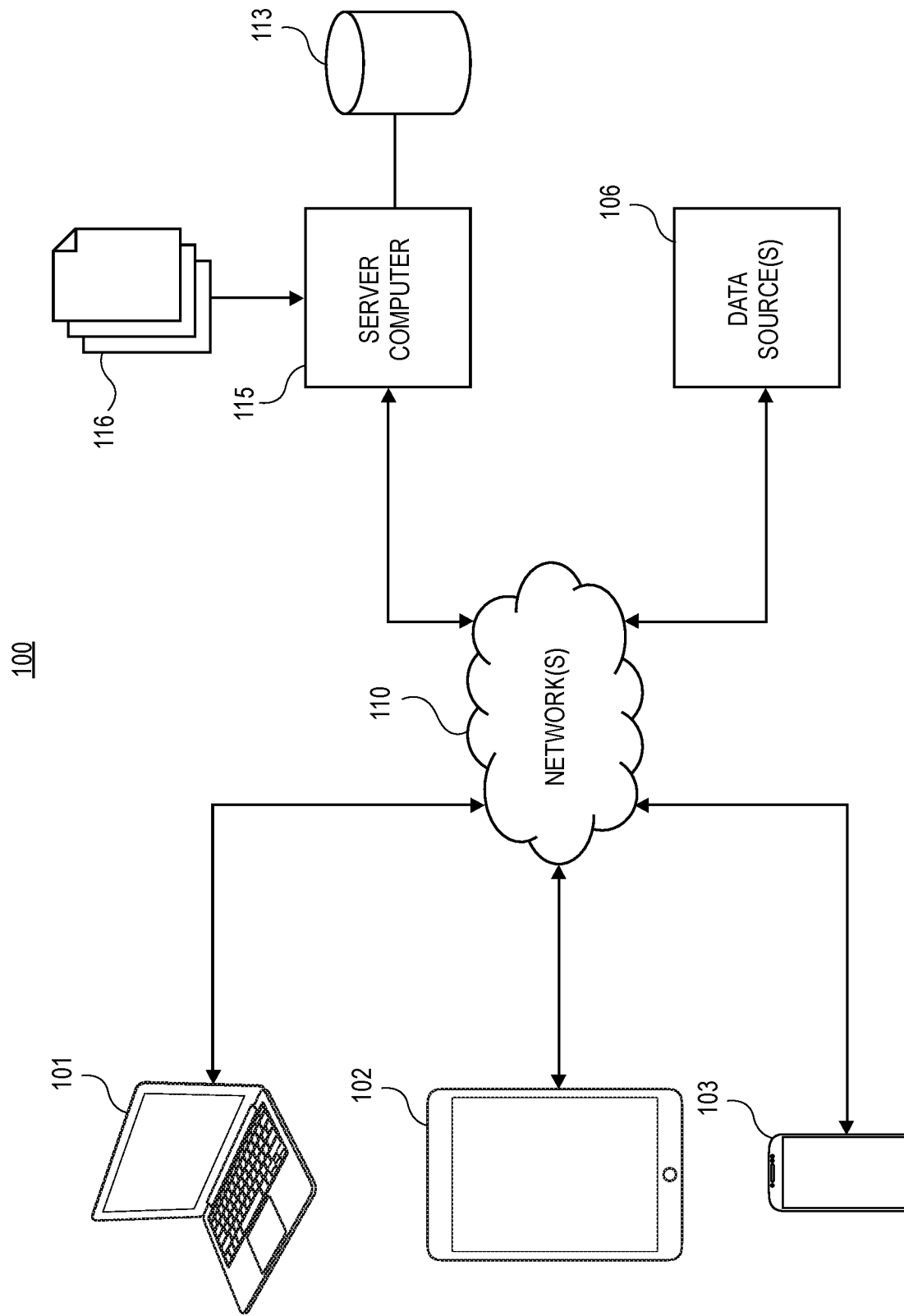
FIG. 1A depicts an overview of components and entities associated with the systems and methods, in accordance with some embodiments.

The present embodiments may relate to, inter alia, platforms and technologies for predicting a result of a product test. According to certain aspects, a set of results of a first product test and a second product test for respective sets of products may be used to generate a machine learning model. Additionally, a sample of an additional product may be tested according to the second product test, where a result from this second product test may be used as an input into the generated machine learning model. An output from the machine learning model may be examined to predict whether the additional product would comply with the first product test.

Systems and methods may initially use various machine learning techniques to train a machine learning model(s) (or more generally, a mathematical model(s)) using a training dataset, where the training dataset may include a set of results of (i) a set of products tested according to a first product test, and (ii) a set of additional products tested according to a second product test. The systems and methods may then store the trained machine learning model(s) for subsequent use. In particular, the systems and methods may use a machine learning model to predict whether a sample of a product would "pass" a given product test (or otherwise be certified according to the product test).

The systems and methods therefore offer numerous benefits. In particular, the use of various machine learning techniques enable the systems and methods to accurately, more consistently, and dynamically predict product compliance with certain product tests. This would be particularly beneficial in circumstances in which a given product test requires a large product sample (or otherwise a product sample that is difficult and/or costly to manufacturer), where the systems and methods may use results from a test on a smaller or less cumbersome product sample to assess how a compliant version of the product would perform on the product test. Thus, the systems and methods could eliminate cable constructions that do not comply, thereby reducing costs associated with ensuring that products comply with certain product tests. It should be appreciated that additional benefits are envisioned. As used herein, the term "product test" may refer to any standard, certification, test, or the like that is created or specified by an entity, agency, governing body, or the like, where each product test may be applicable to a certain type, kind, size, or portion of physical product that may be used in various applications (e.g., construction, consumer goods, manufacturing, maintenance, etc.).

The systems and methods discussed herein address a challenge that is particular to product design and manufacture. In particular, the challenge relates to a difficulty in accurately and effectively assessing whether a given product will comply with one or more applicable product tests or certifications. Conventionally, companies need to manufacture large amounts of product samples that meet certain stringent requirements for the applicable product tests or certifications, which can be expensive and discourage the production of different samples. The systems and methods offer improved capabilities to solve these problems by using data associated with alternative product tests that test easier-manufactured (e.g., smaller batch) product samples, and applying a machine learning model to the data to predict whether a compliant sample of the product would pass the applicable product test. Further, because the systems and methods employ communication between and among multiple devices, the systems and methods are necessarily rooted in computer technology in order to overcome the noted shortcomings that specifically arise in the realm of product design and manufacture.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103 may be an electronic device associated with an entity such as a company, business, corporation, or the like (e.g., a server computer or machine).

The electronic devices 101, 102, 103 may communicate with a server computer 115 via one or more networks 110. In embodiments, the network(s) 110 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). The server computer 115 may be associated with an entity such as a company, business, corporation, or the like, which designs, markets, manufactures, or sells products, or is otherwise involved in the supply chains of the products. The server computer 115 may include various components that support communication with the electronic devices 101, 102, 103.

The server computer 115 may communicate with one or more data sources 106 via the network(s) 110. In embodiments, the data source(s) 106 may compile, store, or otherwise access information associated with product tests, standards, certifications, requirements, and/or the like. In particular, the data source(s) 106 may represent certification entities, governing bodies, and/or the like, and may provide data, to the server computer 115, indicative of or representing various product tests, certifications, or the like. For example, one of the data sources 106 may represent the NFPA, and may provide, to the server computer 115, data associated with NFPA 262 or other NFPA standards.

According to embodiments, the server computer 115 may review or analyze data received from the data source(s) 106 to determine requirements associated with particular product tests or standards. For example, the server computer 115 may review information associated with NFPA 262 and determine that a given a cable specimen complies with NFPA 262 if it predicts a maximum peak optical density (POD) of 0.5 or less, an average optical density (AOD) of 0.15 or less, and a maximum flame spread distance (FSD) of 1.52 m (5 ft) or less.

Additionally, the server computer 116 may receive or access a training dataset 116 that indicates a set(s) of results associated with a set(s) of product tests. For example, the training dataset 116 may indicate (i) a first set of results of a first set of products tested according to NFPA 262 and (ii) a second set of results of a second set of products tested according to a small-scale fire test. According to embodiments, the training dataset 116 may indicate characteristics, dimensions, materials, compositions, and/or qualities of the tested products, as well as any output(s) or result(s) of the applicable product test on a given product. For example, the portion of the training dataset 116 for NFPA 262 may include dimensions and compositions of the tested product specimens, as well as the maximum peak optical density, the average optical density, and the maximum flame spread distance (i.e., the test outputs) for each product specimen as tested, as well as an indication of whether each tested product specimen complies with NFPA 262, and the portion of the training dataset 116 for the small-scale fire test may include dimensions and compositions of the tested product specimens, as well as a test output for each product specimen as tested. It should be appreciated that the server computer 115 may receive the training dataset 116 from one of the data sources 106 or from another source. In an embodiment, the training dataset 116 may include a set of results of a set of products tested according to only the large-scale product test.

According to embodiments, the server computer 115 may employ various machine learning techniques, calculations, algorithms, and the like to generate a set of machine learning models associated with a set of particular product tests. In particular, the server computer 115 may initially train a machine learning model for a given product test(s) using data included in the training dataset 116 that indicates a set of results of product specimens that are tested according to the given product test(s). For example, the server computer 115 may generate a machine learning model associated with both NFPA 262 and a small-scale fire test using a set of results of large-scale cables tested according to the large-scale product test used in associated with NFPA 262 and a set of results of small-scale cables tested according to the small-scale fire test. According to embodiments, the server computer 115 may apply or input a validation set into a set of generated machine learning models to determine which of the machine learning models is most accurate or otherwise may be used as the final or selected machine learning model.

According to embodiments, the server computer 115 may input a set of input data associated with a product into the generated machine learning model, a result of which may predict whether the product would comply with (i.e., pass) the applicable product test. The set of input data may originate from the electronic devices 101, 102, 103, or from another source (e.g., the data source 106). According to embodiments, a respective electronic device 102, 102, 103 may be operated by a user, and may generate or access a set of input data associated with a product that may be subject to a certain product test. The set of electronic devices 101, 102, 103 may transmit the set of input data to the server computer 115 via the network(s) 110.

Generally, the set of input data may be product test data different from the training dataset 116 that the server computer 115 used to generate the machine learning model. In particular, the set of input data may be generated by a test different from the product test that is used to certify a given product. For example, the set of input data for a plenum cable may be the result of a set of specimen cables tested using a small-scale test (e.g., a cone calorimeter). The set of input data may include at least a portion of the parameters or characteristics that are included in the training dataset 116 (e.g., product characteristics, dimensions, materials, compositions, and/or qualities, and any output(s) of the product test on a given product).

After receipt of the set of input data, the server computer 115 may input the set of input data into the applicable machine learning model, and generate a set of outputs that may predict an output of a given product tested according to the product test used to certify the given product. According to embodiments, the set of outputs may align with the set of outputs for the product test. For example, a set of outputs generated using a machine learning model associated with NFPA 262 may include, for a small-scale plenum cable used to generate the set of inputs, the maximum peak optical density, the average optical density, and the maximum flame spread distance for the small-scale plenum cable. Thus, the server computer 115 (or another component) may examine the set of outputs to predict whether the product used to generate the set of inputs would pass the applicable product test.

In predicting whether the product would pass the applicable product test, the server computer 115 may compare the output(s) to a respective set of values, thresholds, and/or the like that are specified in association with the product test. For example, the server computer 115 may compare the maximum peak optical density, the average optical density, and the maximum flame spread distance for the small-scale plenum cable as output by the machine learning model may be compared to the maximum peak optical density of 0.5 or less, the average optical density of 0.15 or less, and the maximum flame spread distance of 1.52 m (5 ft) or less, as specified by NFPA 262.

The server computer 115 may be configured to interface with or support a memory or storage 113 capable of storing various data, such as in one or more databases or other forms of storage. According to embodiments, the storage 113 may store data or information associated with the machine learning models that are generated by the server computer 115. Additionally, the server computer 115 may access the data associated with the stored machine learning models to input a set of inputs into the machine learning models.

Generally, a given small-scale test can assist the manufacturer in discriminating the performance of the applicable products for the design considerations of the manufacturer, but may not replace the need for the applicable large-scale test.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103 interface with the server computer 115, the electronic devices 101, 102, 103 may actually interface with one or more of a number of distributed computers, servers, machines, or the like, to facilitate the described functionalities.

Figure 1B:
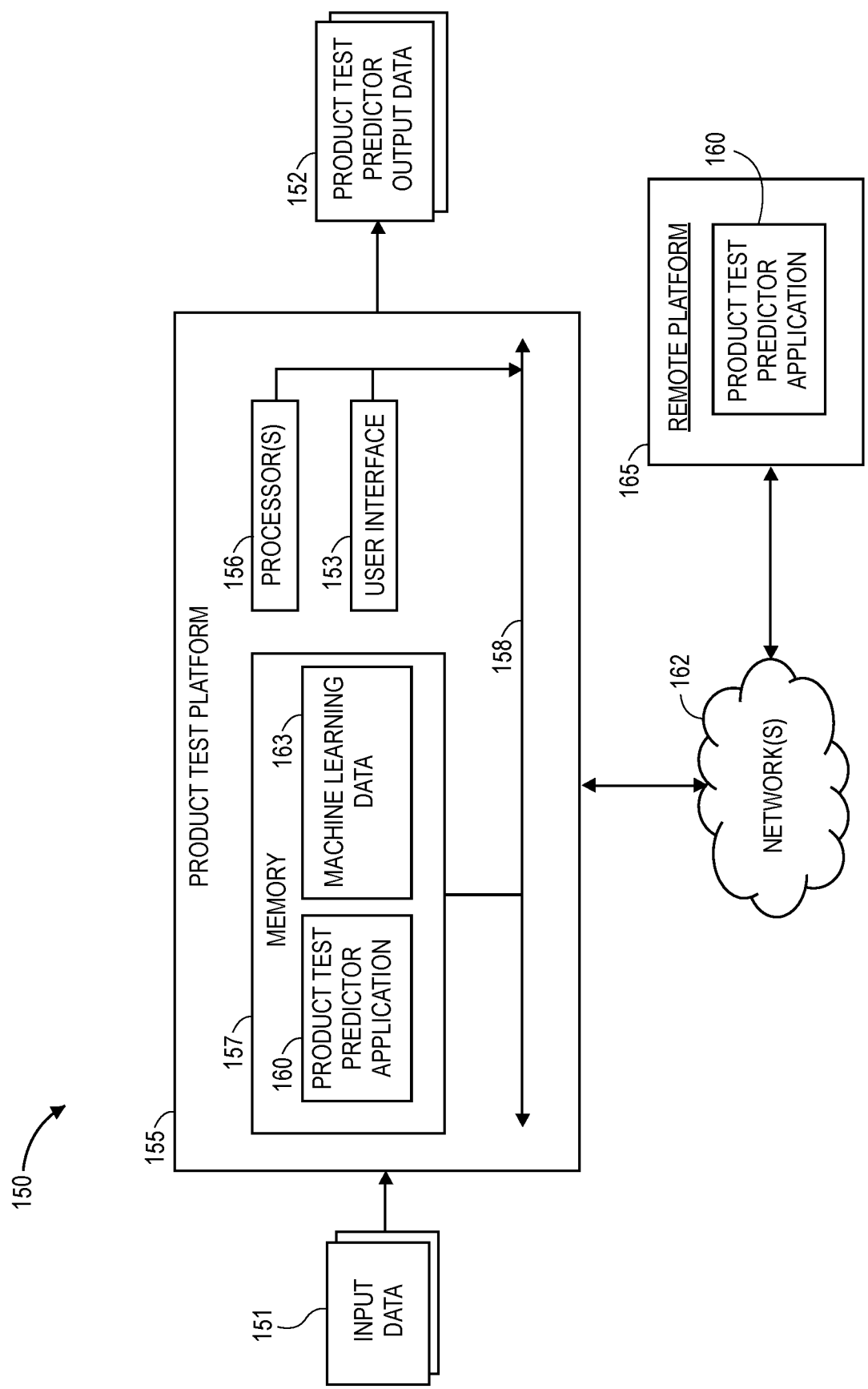
FIG. 1B depicts an overview of certain components configured to facilitate the systems and methods, in accordance with some embodiments.

Although three (3) electronic devices 101, 102, 103, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which a set of input data 151 is processed into product test predictor output data 152 via a product test platform 155, according to embodiments. In one implementation, the set of input data 151 may be a training dataset. The product test platform 155 may be implemented on any computing device, including the server computer 115 (or in some implementations, one or more of the electronic devices 101, 102, 103) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. The computing device may further include various communication components (e.g., transceivers and ports) that may facilitate data communication with one or more additional computing devices.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The product test platform 155 may further include a user interface 153 configured to present content (e.g., the content of the input data 151 and information associated therewith). Additionally, a user may make selections to the content via the user interface 153, such as to navigate through different information, review certain input data, and/or other actions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a product test predictor application 160), data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The product test platform 155 may operate in a networked environment and communicate with one or more remote platforms, such as a remote platform 165, via a network(s) 162, such as a local area network (LAN), a wide area network (WAN), telecommunications network, or other suitable network. The remote platform 165 may be implemented on any computing device, including one or more of the electronic devices 101, 102, 103, or the server computer 115 as discussed with respect to FIG. 1A, and may include many or all of the elements described above with respect to the platform 155. In some embodiments, as will be described herein, the product test predictor application 160 as will be further described herein may be stored and executed by the remote platform 165 instead of by or in addition to the platform 155.

The product test predictor application 160 may employ machine learning techniques such as, for example, a regression analysis (e.g., a logistic regression, linear regression, or polynomial regression), k-nearest neighbors, decisions trees, random forests, boosting, neural networks, support vector machines, deep learning, reinforcement learning, Bayesian networks, or the like. When the data 151 is a training dataset, the product test predictor application 160 may analyze/process the data 151 to generate the machine learning model for storage as part of machine learning data 163 that may be stored in the memory 157.

When the data 151 comprises data associated with a product to be analyzed using the machine learning model associated with a given product test associated with the product, the product test predictor application 160 may analyze or process the data 151 using the machine learning model to generate a set of output values. Additionally, the product test predictor application 160 may predict, from the set of output values, whether the product would comply with the given product test. In some situations, the product test predictor application 160 may add, to the machine learning model, additional product test results so that the product test predictor application 160 may use the updated machine learning model in subsequent input data analysis.

Generally, each of the data 151 and the data 152 may be embodied as any type of electronic document, file, template, etc., that may include various textual content and, for the data 152, a prediction of whether the product associated with the input data 151 would comply with the given product test, and may be stored in memory as program data in a hard disk drive, magnetic disk and/or optical disk drive in the product test platform 155 and/or the remote platform 165.

The product test predictor application 160 (or another component) may cause the product test predictor output data 152 (and, in some cases, the training or input data 151) to be displayed on the user interface 153 for review by the user of the product test platform 155. The user may select to review and/or modify the displayed data. For instance, the user may review the output data 152 to assess the product test compliance prediction associated with a given product.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 2:
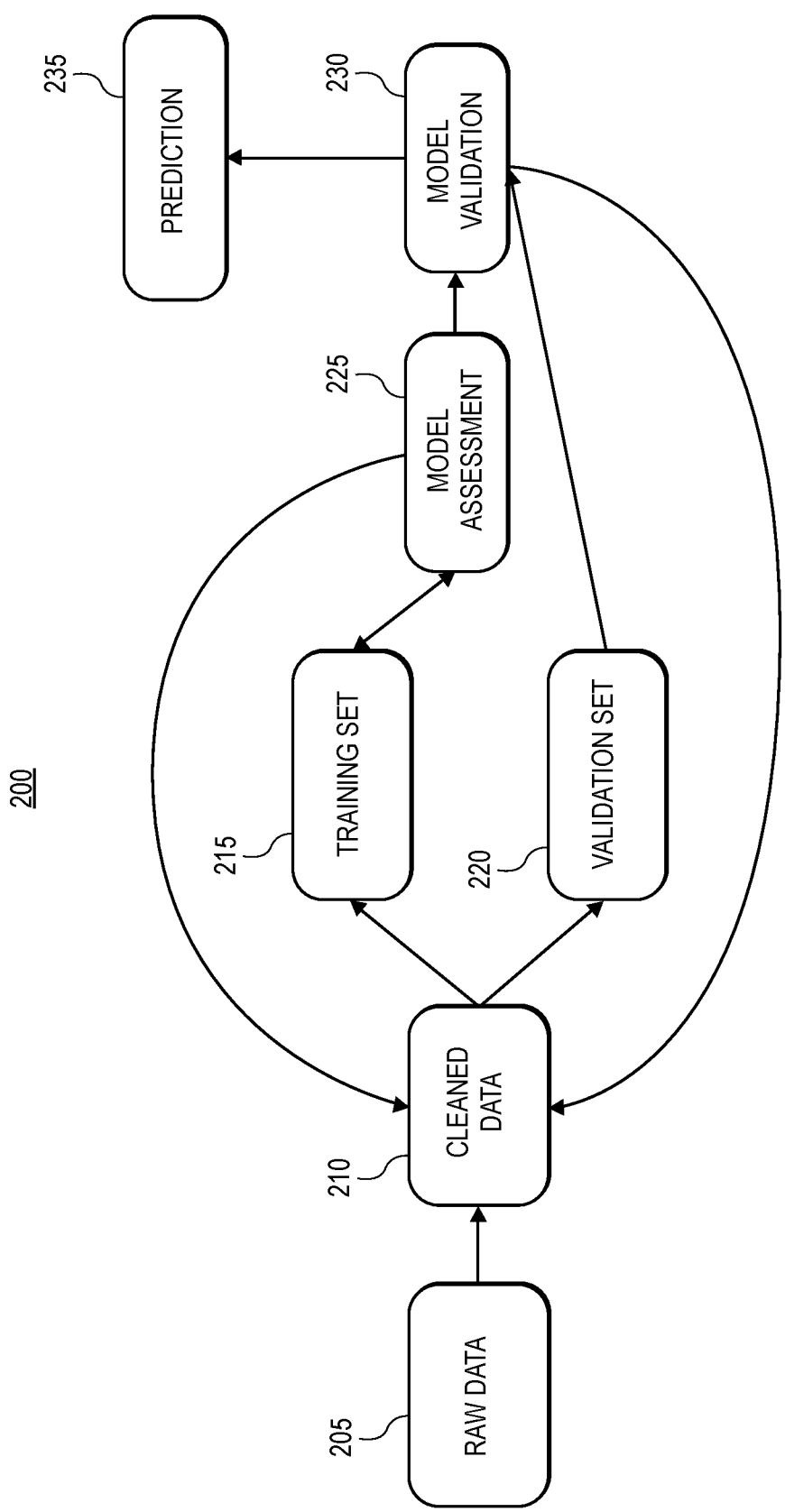
FIG. 2 depicts an illustration of an example flow associated with certain machine learning functionalities, in accordance with some embodiments.

FIG. 2 illustrates an example flow 200 of various machine learning functionalities that may be employed by the systems and methods. The flow 200 includes a set of raw data 205 that may be a set of real-world data representing test results and parameters associated with a product test(s). In particular, the set of raw data 205 may identify products, characteristics of the products (e.g., physical dimensions), composition of the products (i.e., physical materials that make up the products), design of the products (i.e., information indicating how the products are structured), and/or similar information. The set of raw data 205 may further identify a set of results or outputs of an applicable large-scale product test and a small-scale product test. In particular, the set of outputs may be numeric and/or Boolean values or outputs indicating how a product performed in its large-scale product test or small-scale product test.

For example, NFPA 262 is a large-scale test to determine whether the plenum cables comply with the flame spread and smoke generation requirements. Generally, a 25-foot-long test chamber known as a Steiner Tunnel with intake and exhaust ducts and a means of regulating air flow through the tunnel is used to test cable samples. Windows are required to be spaced at 0.5 foot intervals to visually determine the flame spread and an optical device in the exhaust of the chamber is used to measure smoke density. The cable samples are mounted in a cable tray in one layer in the tunnel, after which the tunnel is sealed. Two circular burners are mounted vertically at the intake end of the tunnel and in front of the cable tray. During the test, methane is burned along with a 240 ft/min forced draft through the tunnel for twenty minutes, after which the flame is extinguished. Flame spread and smoke density are monitored throughout the test.

The NFPA 262 test produces three (3) outputs: a flame travel distance, a peak optical density of smoke, and an average optical density of smoke. A given cable will pass NFPA 262 when the flame travel distance does not exceed 1.52 m (5 ft.), the peak optical density of smoke does not exceed 0.5, and the average optical density of smoke does not exceed 0.15, and is deemed as having adequate fire-resistant and low smoke-producing characteristics. When any of these outputs exceeds the threshold value, then the given cable will not meet the requirements in NFPA 262.

The set of raw data 205 associated with NFPA 262 may, for each cable in the set of raw data 205, identify the cable (e.g., "Cable A"), and include data indicative of characteristics, composition, and design of the cable. Additionally, the set of raw data 205 may, for each cable in the set of raw data 205, include the flame travel distance, the peak optical density, and the average optical density resulting from completion of the NFPA 262 test, as well as indicate whether the particular cable passed or did not pass the NFPA 262 test.

In this example, the set of raw data 205 may further include a set of results for small-scale cables tested according to a small-scale test (e.g., a test administered by a cone calorimeter). This portion of the set of raw data 305 may, for each small-scale cable tested according to the small-scale test, identify the cable (e.g., "Cable A"), and include data indicative of characteristics, composition, and design of the cable. Additionally, the set of raw data 205 may, for each small-scale cable, include various metrics and values associated with results of the small-scale test.

An electronic device may clean the set of raw data 205 to remove incomplete data, conflicting data, erroneous data, and/or the like, and accordingly result in a set of cleaned data 210. According to embodiments, the electronic device may divide or segment the set of raw data 205 into a training set 215 and a validation set 220, where there may or may not be overlap between the training set 215 and the validation set 220. The electronic device may create, using the training set 215, a set of machine learning models, which may be represented by the model assessment 225 of FIG. 2. In embodiments, the electronic device may create any number of machine learning models of various types, for example a flat model, a hierarchical model, a network model, a relational model, an object-relational model, or other types of machine learning models.

The electronic device may apply or input the validation set 220 into each of the created machine learning models, which may be represented by a model validation 230 of FIG. 2. In applying or inputting the validation set 220 into each of the created machine learning models, the electronic device may determine which of the machine learning models is most accurate or otherwise may be used as the final or selected machine learning model, which may be represented by a prediction 235 of FIG. 2. In particular, the prediction 235 may represent the selected machine learning model into which real-world data may be input, where the selected machine learning model may generate an output based on the trained and validated machine learning model.

Figure 3:
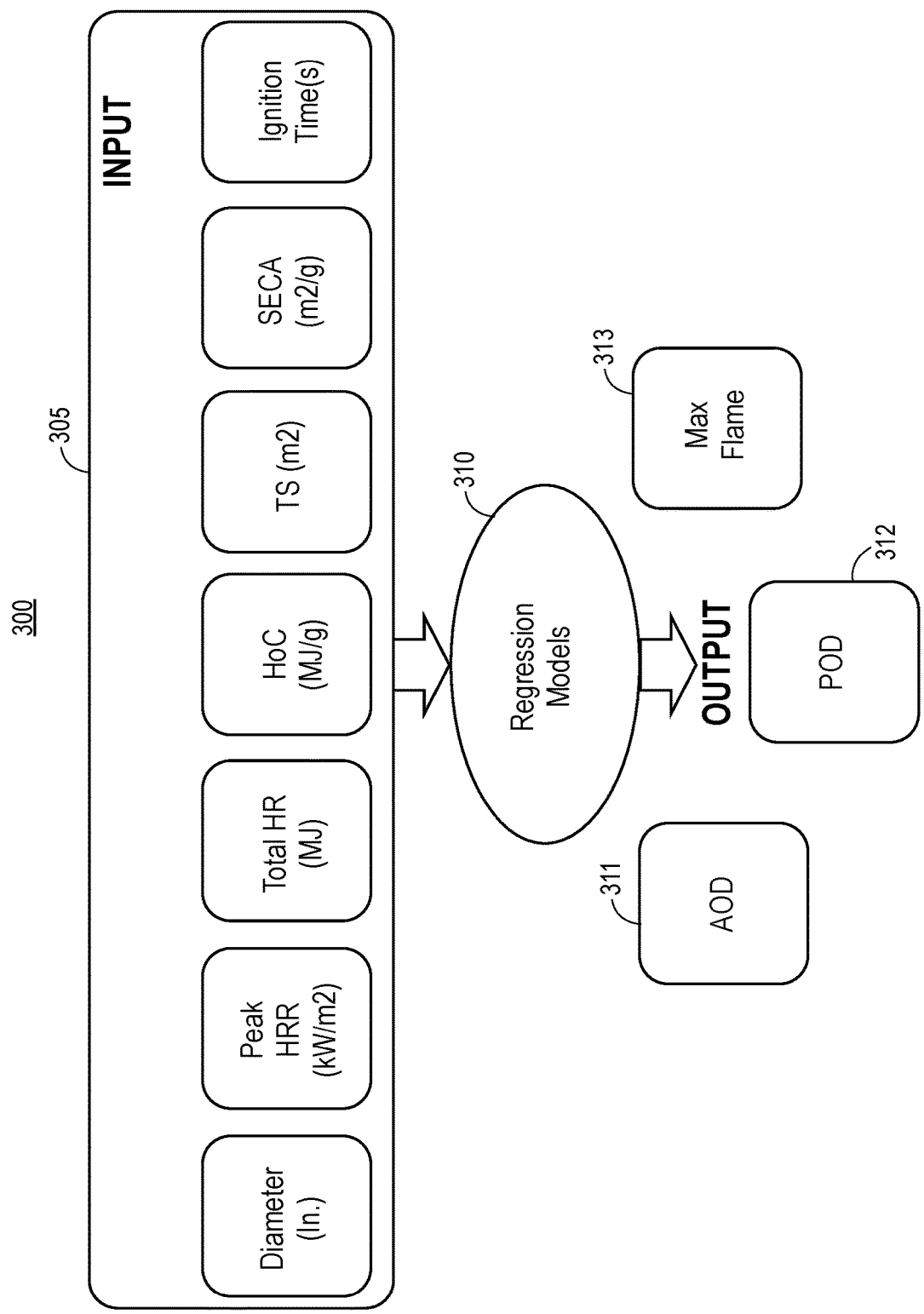
FIG. 3 depicts an example diagram including inputs and outputs associated with an example machine learning model, in accordance with some embodiments.

FIG. 3 illustrates a diagram 300 depicting inputs and outputs associated with a machine learning model. In particular, the diagram 300 includes a set of inputs 305 that represent parameters or outputs associated with a small-scale product test. For example, as shown in FIG. 3, the set of inputs 305 may be associated with a small-scale cable fire test, and may include the following inputs: diameter (in.), peak heat release rate (kW/m2), total heat release (MJ), heat of combustion (MJ/g), total smoke (TS) (m2), SECA (m2/g), and ignition time(s). It should be appreciated that a given product may have its own set of inputs 305. It should be appreciated that the set of inputs 305 may vary depending on the type of product test.

An electronic device may support a set of regression models 310 into which the set of inputs 305 for a given small-scale product may be input. According to embodiments, the set of regression models 310 may correspond to the prediction 235 as discussed with respect to FIG. 2. The electronic device may generate a set of outputs based on inputting the set of inputs 305 into the regression model 310. According to embodiments, the electronic device may analyze the set of outputs the predict how a large-scale version of the product would perform on the large-scale product test.

For example, as depicted in FIG. 3, the set of outputs may be associated with standard NFPA 262 for plenum cables, and include an average optical density (AOD) 311, a peak optical density (POD) 312, and a max flame spread distance (313). The outputs 311, 312, 313 may represent predicted outputs associated with testing a hypothetical large-scale version of a cable using the large-scale cable fire test. According to standard NFPA 262, a given cable will comply with the standard if the MOD is 0.5 or less, the AOD is 0.15 or less, and the maximum flame spread distance is 1.52 m (5 ft) or less.

Accordingly, the electronic device may predict, based on the outputs 311, 312, 313, whether the hypothetical large-scale version of the cable would comply with the NFPA 262 standard. For example, if the AOD 311 is 0.10, the MOD 312 is 0.46, and the maximum flame spread distance 313 is 1.39 m for a given small-scale cable, then the electronic device may predict that a corresponding large-scale cable would comply with NFPA 262. For further example, if the AOD 311 is 0.14, the MOD 312 is 0.36, and the maximum flame spread distance 313 is 1.56 m for a given small-scale cable, then the electronic device may predict that a corresponding large-scale cable would not comply with NFPA 262.

Figure 4:
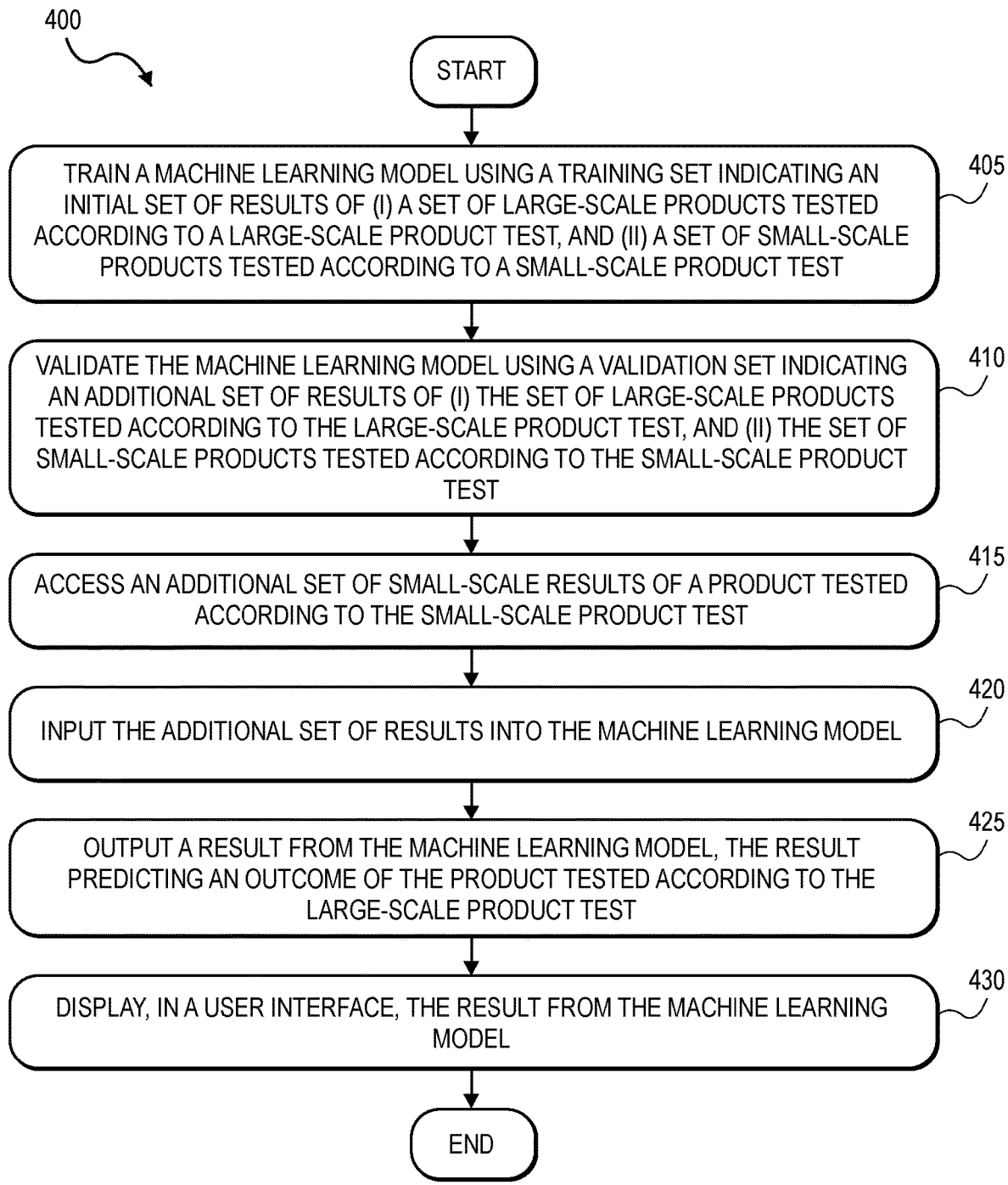
FIG. 4 is an example flowchart associated with predicting an outcome of a product test, in accordance with some embodiments.

FIG. 4 depicts is a block diagram of an example method 400 for predicting an outcome of a large-scale product test. The method 400 may be facilitated by an electronic device (such as the server computer 115 or components associated with the product test platform 155 as discussed with respect to FIGS. 1A and 1B) that may be in communication with additional devices or data sources.

The method 400 may begin when the electronic device trains (block 405) a machine learning model using a training set indicating an initial set of results of (i) a set of large-scale products tested according to a large-scale product test, and (ii) a set of small-scale products tested according to a small-scale product test. The electronic device may further validate (block 410) the machine learning model using a validation set indicating an additional set of results of (i) the set of large-scale products tested according to the large-scale product test, and (ii) the set of small-scale products tested according to the small-scale product test. According to embodiments, the training set may at least partially overlap with the validation set, or may not overlap.

The electronic device may access (block 415) an additional set of small-scale results of a product tested according to the small-scale product test. In embodiments, the large-scale product test may be a large-scale cable fire test (e.g., NFPA 262), the small-scale product test may be a small-scale cable fire test (e.g., a test administered by a cone calorimeter), the product may be a cable, and the set of large-scale products may be a set of large-scale cables. It should be appreciated that additional products and corresponding product tests are envisioned. Additionally, it should be appreciated that the "large-scale" product test may merely be a first version of a product test (without any size requirement), and the "small-scale" product test may merely be a second version of the product test (without any size requirement).

The electronic device may input (block 420) the additional set of results into the machine learning model. Accordingly, the electronic device may use the additional set of results as a set of inputs into the machine learning model. The electronic device may output (block 425) a result from the machine learning model, where the result may predict an outcome of the product tested according to the large-scale product test. In embodiments, the result from the machine learning model may be embodied as a set of outputs as specified by the corresponding large-scale product test. Accordingly, the electronic device may use the results of the small-scale test for a product to predict an outcome of the product being tested according to the large-scale product test. The electronic device may display (block 420), in a user interface, the result from the machine learning model, and/or an indication of compliance with the large-scale product test. According to embodiments, a user may review the result to make assessments, select certain information, and/or facilitate other functionalities.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A method for using machine learning to accurately predict outcomes of large-scale cable fire tests, the method comprising:

administering, in a test chamber, a large-scale cable fire test on a set of large-scale cables in accordance with NFPA 262 cable testing requirements;

obtaining, by a processor, a first set of results of the large-scale cable fire test administered on the set of large-scale cables, the first set of results comprising, for each of the set of large-scale cables, a max flame spread distance, a peak optical density, and an average optical density;

administering, by a cone calorimeter, a small-scale cable fire test on a set of small-scale cables;

obtaining, by the processor, a second set of results of the small-scale cable fire test administered on the set of small-scale cables, the second set of results comprising, for each of the set of small-scale cables, a diameter, a peak heat release rate, a total heat release, a heat of combustion, a total smoke metric, and an ignition time;

cleaning, by the processor, the first set of results and the second set of results to remove incomplete data, conflicting data, and erroneous data, resulting in a set of cleaned data;

segmenting, by the processor, the set of cleaned data between a training dataset and a validation dataset, wherein the training dataset at least partially overlaps with the validation set;

training, by the processor, a plurality of machine learning models using the training dataset, wherein the plurality of machine learning models are of different types;

inputting, by the processor, the validation dataset into each machine learning model of the plurality of machine learning models to determine a machine learning model of the plurality of machine learning models that is most accurate in assessing how a given large-scale version of a given small-scale cable would perform on the large-scale cable fire test;

administering, by the cone calorimeter, the small-scale cable fire test administered on an additional small-scale cable;

obtaining, by the processor, an additional set of results of the small-scale cable fire test administered on the additional small-scale cable, the additional set of results comprising, for the additional small-scale cable, an additional diameter, an additional peak heat release rate, an additional total heat release, an additional heat of combustion, an additional total smoke metric, and an additional ignition time;

inputting, by the processor, the additional set of results into the most accurate machine learning model; and after inputting the additional set of results into the most accurate machine learning model, outputting, by the processor, a result from the most accurate machine learning model, the result (i) comprising at least one of: an average optical density output, a peak optical density output, or a max flame spread distance output, and (ii) predicting an outcome of a large-scale version of the additional small-scale cable tested according to the large-scale cable fire test.

2. The method of claim 1, further comprising:
displaying, in a user interface, the max flame spread distance output, the peak optical density output, and the average optical density output.

3. A system for using machine learning to accurately predict outcomes of large-scale cable fire tests, comprising:
a test chamber in which the large-scale cable test is administered on a set of large-scale cables in accordance with NFPA 262 cable testing requirements;
a cone calorimeter configured to administer (i) a small-scale cable fire test on a set of small-scale cables, and (ii) the small-scale cable fire test on an additional small-scale cable;
a processor;
a memory; and
a non-transitory computer-readable memory interfaced with the processor and the memory, and storing instructions thereon that, when executed by the processor, cause the processor to:
obtain a first set of results of the large-scale cable fire test administered on the set of large-scale cables, the first set of results comprising, for each of the set of large-scale cables, a max flame spread distance, a peak optical density, and an average optical density,
obtain a second set of results of the small-scale cable fire test administered on the set of small-scale cables, the second set of results comprising, for each of the set of small-scale cables, a diameter, a peak heat release rate, a total heat release, a heat of combustion, a total smoke metric, and an ignition time,
clean the first set of results and the second set of results to remove incomplete data, conflicting data, and erroneous data, resulting in a set of cleaned data,
segment the set of cleaned data between a training dataset and a validation dataset, wherein the training dataset at least partially overlaps with the validation set,
train a plurality of machine learning models using the training dataset, wherein the plurality of machine learning models are of different types,
input the validation dataset into each machine learning model of the plurality of machine learning models to determine a machine learning model of the plurality of machine learning models that is most accurate in assessing how a given large-scale version of a given small-scale cable would perform on the large-scale cable fire test,
obtain an additional set of results of the small-scale cable fire test on the additional small-scale cable, the additional set of results comprising, for the additional small-scale cable, an additional diameter, an additional peak heat release rate, an additional total heat release, an additional heat of combustion, an additional total smoke metric, and an additional ignition time,
input the additional set of results into the most accurate machine learning model, and
after inputting the additional set of results into the most accurate machine learning model, output a result from the most accurate machine learning model, the result (i) comprising at least one of: an average optical density output, a peak optical density output, or a max flame spread distance output, and (ii) predicting an outcome of a large-scale version of the additional small-scale cable tested according to the large-scale cable fire test.

4. The system of claim 3, further comprising:
a user interface;
wherein the non-transitory computer-readable memory stores additional instructions thereon that, when executed by the processor, further cause the processor to:
cause the user interface to display the max flame spread distance output, the peak optical density output, and the average optical density output.

* * * * *